United States Patent [19]

Kraus

[11] 4,275,610

[45] Jun. 30, 1981

[54] INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 116,044

[22] Filed: Jan. 28, 1980

Related U.S. Application Data

[63] Continuation of Ser. No. 10,367, Feb. 8, 1979, abandoned.

[51] Int. Cl.³ .................. F16H 15/08; F16H 15/26; F16H 13/10
[52] U.S. Cl. .................. 74/200; 74/198; 74/201; 74/207; 74/211
[58] Field of Search ............... 74/198, 200, 201, 213, 74/211, 207, 199

[56] References Cited

U.S. PATENT DOCUMENTS

| | | | |
|---|---|---|---|
| 671,662 | 4/1901 | White | 74/200 |
| 2,856,784 | 10/1958 | Weisel | 74/200 |
| 3,142,190 | 7/1964 | Kelsey et al. | 74/200 |
| 3,440,895 | 4/1969 | Fellows | 74/200 |
| 3,455,177 | 7/1969 | Schofield | 74/200 |
| 3,486,391 | 12/1969 | Kraus | 74/200 |
| 3,570,317 | 3/1971 | Kraus | 74/200 |
| 3,788,713 | 1/1974 | Kraus | 308/160 |
| 3,810,398 | 5/1974 | Kraus | 74/200 |
| 3,820,408 | 6/1974 | Louis | 74/200 |
| 4,061,045 | 12/1977 | Kopp | 74/198 |
| 4,086,820 | 5/1978 | Kraus et al. | 74/200 |
| 4,126,052 | 11/1978 | Jackman | 74/200 |

FOREIGN PATENT DOCUMENTS

| | | | |
|---|---|---|---|
| 405809 | 11/1924 | Fed. Rep. of Germany | 74/200 |
| 817984 | 10/1951 | Fed. Rep. of Germany | 74/200 |
| 939478 | 2/1956 | Fed. Rep. of Germany | 74/200 |
| 1007407 | 5/1952 | France | 74/198 |
| 254341 | 12/1927 | United Kingdom | 74/200 |
| 1376057 | 12/1974 | United Kingdom | 74/198 |

*Primary Examiner*—Leslie Braun
*Attorney, Agent, or Firm*—Klaus J. Bach

[57] ABSTRACT

A rotary motion transmitting device having oppositely disposed toric discs mounted on its input and output shafts. Motion transmitting traction rollers are frictionally engaged between the toric discs for transmitting motion from one toric disc to the other and tension sheets extend between opposite rollers to balance forces exerted on the rollers. Pivotal roller supports are provided for controlling the transmission ratio and means are associated with said pivotal roller supports for forcing the traction rollers toward each other and into firm frictional engagement with the toric discs.

10 Claims, 5 Drawing Figures

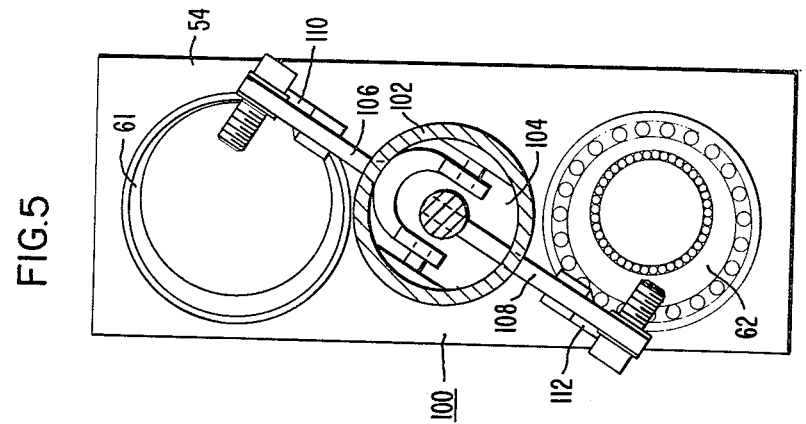
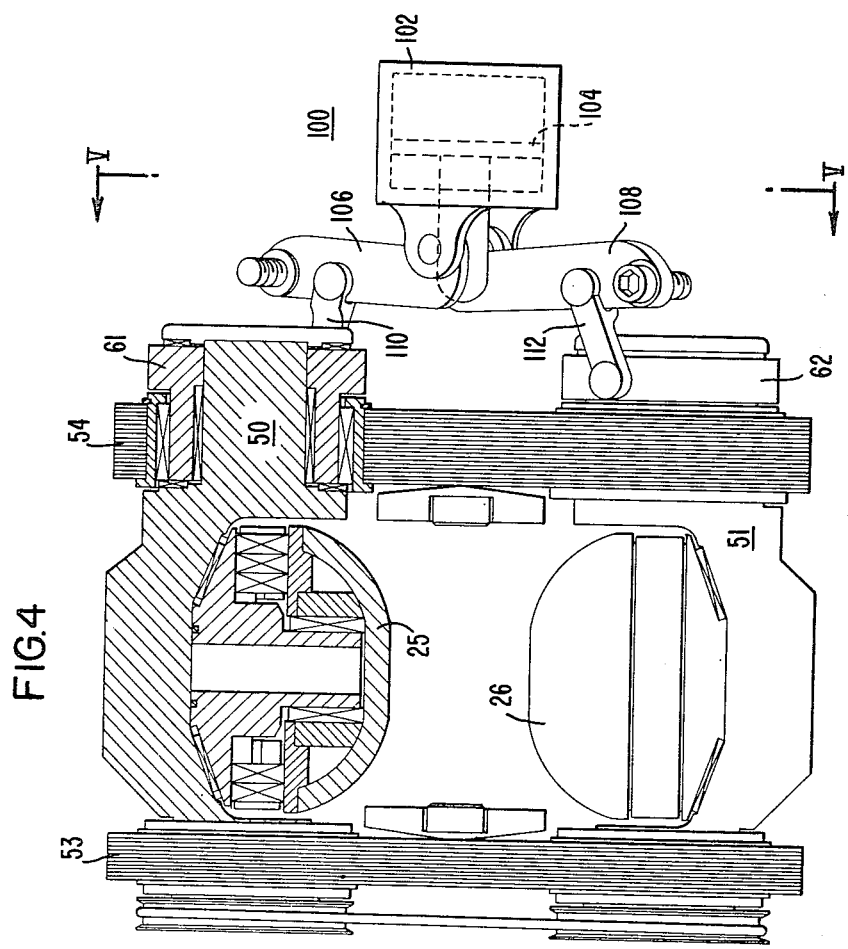

INFINITELY VARIABLE TRACTION ROLLER TRANSMISSION

This is a continuation of application Ser. No. 010,367, filed Feb. 8, 1979, now abandoned.

BACKGROUND OF THE INVENTION

1. Field of the Invention

The invention relates to infinitely variable traction roller transmissions in which motion is transmitted from a toric disc mounted on an input shaft to a toric disc mounted on an output shaft by traction rollers disposed between, and in engagement with, the toric discs.

To enable such toroidal traction roller transmissions to transmit large torques at high speeds for long life the traction rollers are positioned inwardly of the center of the toroidal cavity between the toric discs. Such an arrangement causes relatively little spin in the contact area of the traction rollers with the toric discs so that a relatively high traction coefficient and relatively little wear on the surfaces of the toric discs and the traction rollers are obtained. The contact forces necessary for engagement of the traction rollers with the toric discs are obtained by forcing the toric discs in engagement with the traction rollers.

2. Description of the Prior Art

Such traction roller transmissions are described in the applicant's U.S. Pat. No. 4,086,820 and also in applicant's earlier U.S. Pat. No. 3,810,398 wherein a rotary motion transmitting device is provided in which the support structures of the power rollers are interconnected by tension means which extend between the toric discs and balance the forces and vibrations exerted on the power rollers while allowing nearly friction free transverse motion of the roller assemblies for transverse shifting of the roller assembly for transmission ratio changing pivoting of the roller support structure. For engagement of the traction rollers with the toric discs, the toric discs are forced toward each other by cam structures generating load-dependent contact forces. Providing the proper amount of contact forces has been quite problematic especially as the cam structures are subject to wear after some time of use. If a drive is operated at a fairly constant load, its loading cam structure remains in an essentially constant position. Over an extended period, vibrations in the drive have a fretting action on the cam ramp surfaces which causes local changes in the ramp angle resulting in a change of the contact forces.

Also, the axial force provided by the cam structure is directly proportional to the torque applied but often this is not the proper match for the required contact forces of the drive because of the drive geometry. At the points of the greatest transmission ratios, the traction rollers are in contact with one of the toroidal discs on a surface area which has a relatively small angle with the axis of the discs so that wedging between the traction rollers and the toroidal discs takes place resulting in relatively high contact forces. Further the contact forces are not purely axial; they rather have a radial component which may be substantial depending on the angle between the axis and the contact surface area of the toroidal discs and which may result in a slight radial deflection of the traction roller support structure. This again will allow further increased axial movement of the traction discs. Axial movement of the traction discs in turn causes the traction rollers to move sidewise on their support structures in order to maintain equal axial forces at the two contact points of each roller. Since, however, at high transmission ratio the rollers are in contact with the respective disc at a small diameter area, this movement allows even further increased axial movement of the discs toward ech other. As a result, there is a considerable cam rise needed in order to prevent snapping over of the cam structures. Many drives have therefore two cam structures, one at the input and one at the output shaft. This however may only aggravate the problem since the torques of the input and output shafts are very different at the end points of the transmission ratio changes and, naturally, the cam structure exposed to the smaller torque will not respond while the cam structure exposed to the greater torque cannot provide for the axial movement of both cam structures.

SUMMARY OF THE INVENTION

In an infinitely variable traction roller transmission in which the power transmitting traction rollers are disposed between toric discs carried by input and output shafts, the traction rollers are mounted on pivotal support structures to permit change of the transmission ratio.

Means are provided for forcing the pivotal support structures and the traction rollers mounted thereon toward each other and into frictional engagement with the toric discs for the transmission of motion from one to the other of the toric discs.

BRIEF DESCRIPTION OF THE DRAWINGS

FIG. 4 shows an arrangement similar to FIG. 2, but with a linkage structure for manipulation of the pivot shafts; and FIG. 5 is a side view of the linkage structure taken along line V—V of FIG. 4.

DESCRIPTION OF THE PREFERRED EMBODIMENT

Figure 1:
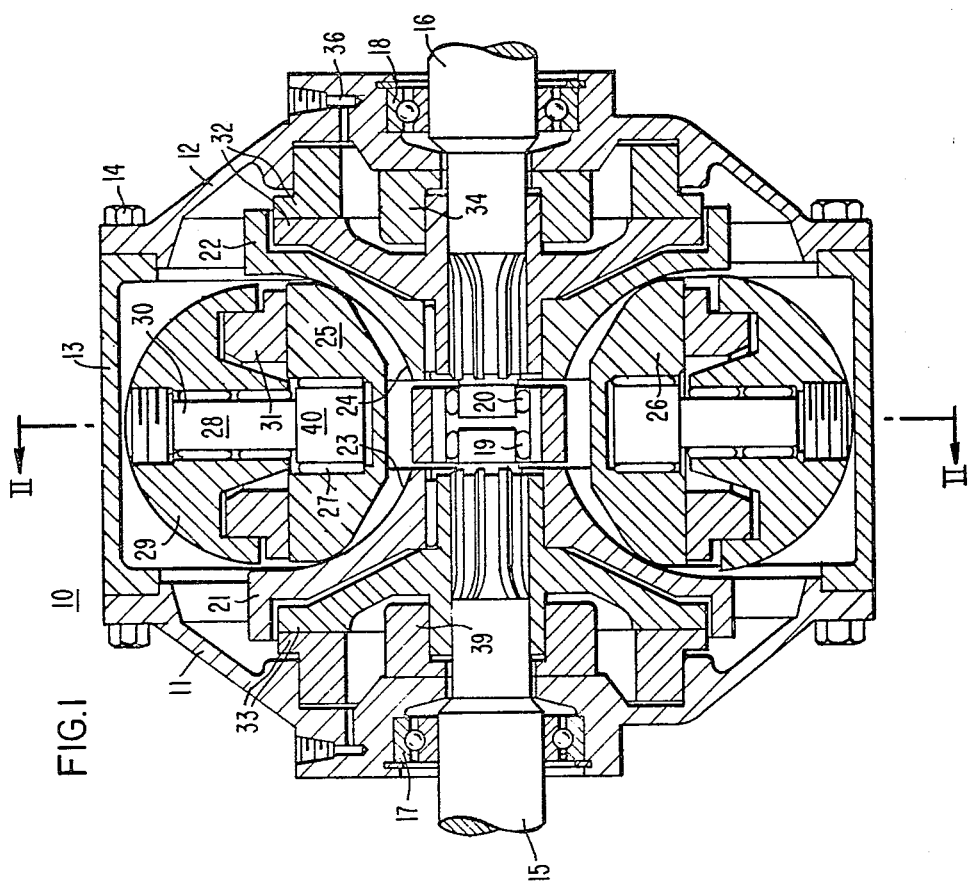
FIG. 1 is a cross-sectional view of the motion transmitting device showing the general arrangement of the elements of the device.

As shown in FIG. 1, the rotary motion transmitting device comprises a housing 10 consisting of a central part 13, a front part 11 disposed at one end of the central part 13 and a rear part 12 disposed at the opposite end of the central part 13. The housing parts 11, 12 and 13 are held together by tension bolts 14. Coaxial input and output shafts 15 and 16 extend through the front and the rear parts 11 and 12 of the housing 10 and are rotatably supported by input and output shaft bearings 17 and 18 and by central support bearings 19 and 20, or alternatively, one shaft may extend into a central bore in the other shaft to be supported therein.

The input shaft 15 carries an input traction disc 21 and the output shaft 16 carries an output traction disc 22 disposed opposite the input traction disc. The traction discs 21 and 22 have opposite toroidal surfaces 23 and 24 and are adapted to engage therebetween traction rollers 25 and 26 for the transmission of motion from the input traction disc to the output traction disc. The traction rollers 25 and 26 are supported by bearings 27 on a shaft 28 journalled in a roller support structure 29. The shaft 28 has eccentric bearing portions 30 and 40 to permit slight movement of the rollers in a direction normal to the shaft when necessary for firm engagement with the input and output traction discs. Axial support is provided for the traction rollers 25 and 26 by axial thrust bearings and seal assemblies 31 preferably of the type as described in applicant's earlier U.S. Pat. No. 3,788,713 issued Jan. 29, 1974 or in U.S. Pat. No. 3,486,391.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22. Similarly, the input traction disc 21 is mounted on an axial input thrust member 33 which is mounted on the input shaft 15 for rotation therewith and axially supported by the hydrostatic axial thrust bearing 39 disposed between the thrust member 33 and the housing part 11. The hydrostatic axial thrust bearings 39 and 34 are preferably of the type described in the present inventor's earlier U.S. Pat. No. 3,788,713. Hydraulic fluid is supplied to the bearings through passages 36 as shown in FIG. 1 only for bearing 34.

Figure 2:
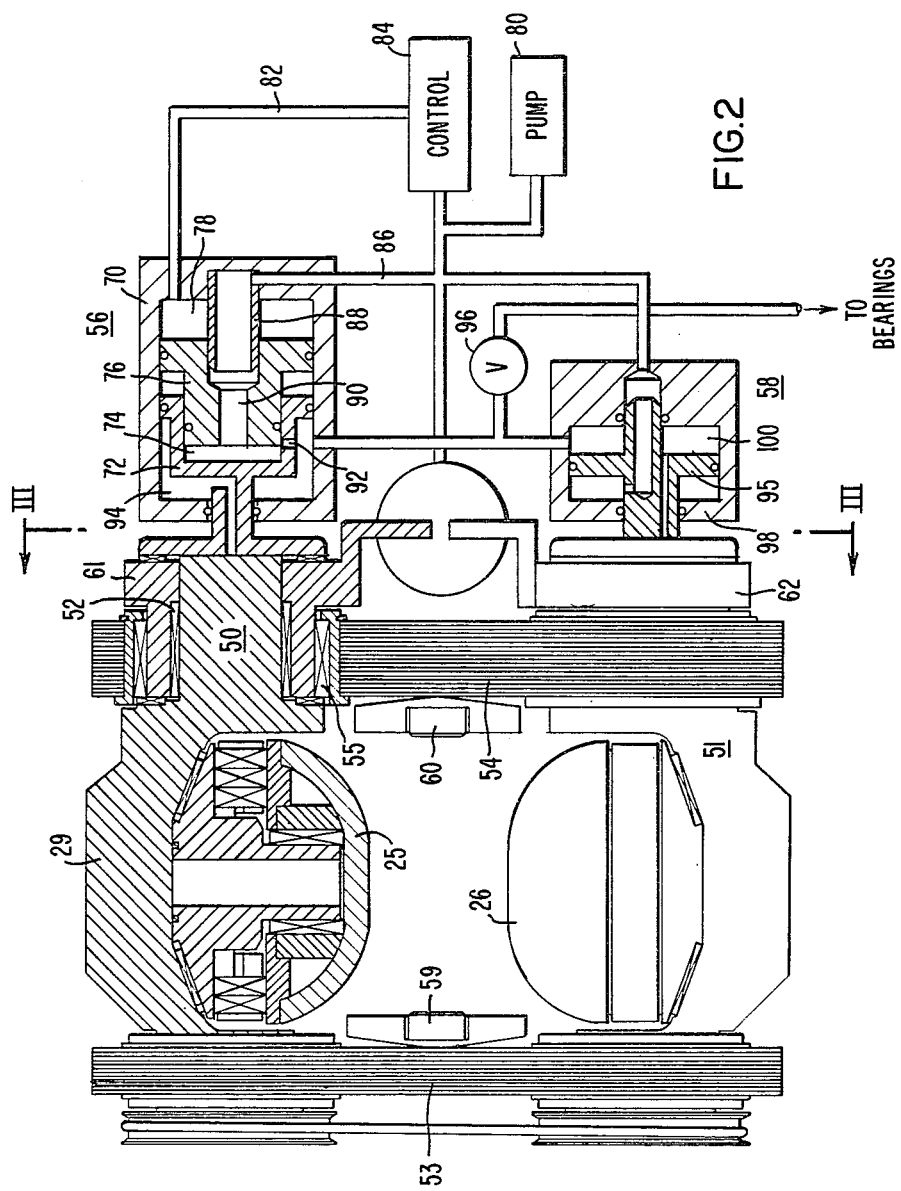
FIG. 2 is essentially a cross-sectional view along lines II—II of FIG. 1 showing the suspension arrangement for the roller support structure without the housing.

The roller pivot structure 29 is more clearly shown in FIG. 2. The rollers 25 and 26 are supported in the housing 10 by pivot shafts 50 and 51 which are disposed in radial symmetry with respect to the input and output shafts, that is, with two rollers, diametrically opposite each other, and supported by radial bearings 52 on tension sheets 53 and 54 which take up the radial bearing load as caused by the contact forces of the rollers 25 and 26. The contact forces are generated by forcing the power rollers 25 and 26 toward each other and into firm frictional engagement with the traction discs 21, 22 in a manner which will be described later. The contact forces of both opposite traction rollers 25 and 26 are the same and the radial resultants directed in opposite directions are balanced by the tension sheets so that the housing 10 is not subjected to such forces and to vibrations as caused by the traction rollers 25, 26.

As is known in the art, changing of the transmission ratio is effected by changing the angular position of the pivot shafts and, in accordance therewith, the circles of engagement of the input and output traction discs with the traction rollers. A change of the transmission ratio is obtained by axially moving the pivot shafts 50 and 51 in the same sense with regard to the direction of movement of the traction surfaces of the toroidal discs 21 and 22 that is, by moving the opposite pivot shafts 50 and 51 slightly in opposite directions. Such axial movement of the pivot shafts is achievable by piston and cylinder structures 56, 58 associated with the pivot shafts 50 and 51, respectively. The pivot shafts 50 and 51 are rotatably supported by the bearings 52, but they are axially movable with respect to each other inasmuch as the tension sheets 53 and 54 are resilient and are so supported means 59, 60 as to permit movement of their free ends.

Figure 3:
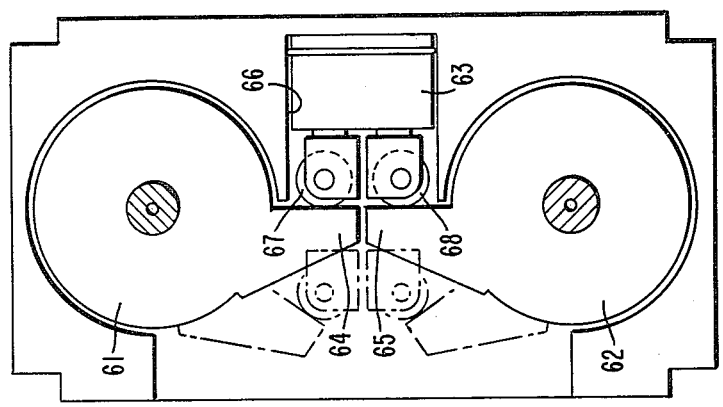
FIG. 3 is a top view of an actuating mechanism for forcing the pivot shifts supporting the power rollers toward each other, taken along line III—III of FIG. 2.

The bearings 52 for the pivot shafts 50 and 51 are eccentrically mounted in sleeves 61 which are rotatably supported in the tension sheets 54 by bearings 55 and which can be rotated by a power piston 63 movably disposed in a cylinder 66 and engaging arms 64 and 65 of the sleeves 61 and 62. FIG. 3 shows the halves of the power piston 63 with the respective eccentric sleeves 61 and 62 near their respective end positions. In the embodiment shown the power piston 63 has rollers 67 and 68 for engagement with the arms 64 and 65 of the eccentric sleeves and for smooth rotation of the eccentric sleeves 61, 62, which rotation moves the pivot shafts 50 and 51 and, together therewith, the traction rollers 25, 26 toward each other and into firm engagement with the traction discs 21 and 22.

The piston and cylinder structure 56 consists of a cylinder 70 associated with the housing portion 13 and having disposed therein a power piston 72 which is connected to the pivot shaft 50. The power piston 72 has a cylindrical cavity 74 which receives a control piston 76 adapted to control movement of the power piston 72. A control cylinder cavity 78 is formed between the cylinder housing 70 and the control piston 76 to which control cavity 78 fluid under pressure by a pump 80 may be admitted through line 82, the pressure of the control fluid being adjustable by a control device 84. Pressurized fluid under full pump pressure is admitted to the piston cavity 74 inside the power piston 72 through line 86 and the tube 88 centrally extending into the control piston 76, and through a passage 90 in the piston 76. The power piston 72 has a relief passage 92 through which pressurized fluid is discharged from the piston cavity 74 whenever the passage 92 is opened by a controlling outward movement of the piston 76 or by a precess movement of piston 72 in the opposite direction. The passage 92 is in communication with a back pressure cavity 94 behind the power piston 72 and with a pressure relief valve 96 which maintains the back pressure in the cavity at a relatively constant value and from which the fluid is preferably discharged to serve as pressurized lubricant for the various bearings.

Since the control cylinder cavity 78 is larger than the piston cavity 74, the fluid in the cavity 78 is capable of moving the control piston to any desired position against the full pump pressure of the fluid in the piston cavity 74. The power piston 72 essentially follows the movement of the control piston 76. If, for example, the control piston 76 is moved inwardly to close the passage 92, the pump pressure is building up in the piston cavity 74 and the piston 72 follows the movement of the control piston 76 until the passage 92 is again opened. If the control piston 76 is retracted, the fluid pressure in the piston cavity 74 decays to the relief valve pressure and the power piston follows the control piston 76 until the passage 92 is about to close.

The movement of and the force applied to power piston 72 and accordingly to pivot shaft 50 is actually dependent on the pressure differential between the piston cavity 74 and the back pressure cavity 94 and the same pressure differential is applied to the piston 95 in cylinder 98 only in an opposite manner as cylinder chamber 100 is in communication with the piston cavity 74 and the cylinder chamber 100 on the other side of the piston 95 is in communication with the back pressure cavity 94. Accordingly, if the piston 72 and the pivot shaft 50 at one side are forced in one direction, the piston 95 and the pivot shaft 51 are forced in the opposite direction with the same axial forces.

OPERATION OF THE TRANSMISSION

Admission of pressurized fluid to the cylinder 66 causes rotation of the eccentric sleeves 61 and 62 such that the pivot shafts 50 and 51 and the traction rollers 25 and 26 are moved toward each other and into firm frictional engagement with the traction discs 21 and 22. Rotation of the input shaft 15 and the traction disc 21 in one direction causes rotation of the traction disc 22 and the output shaft 16 in the opposite direction. Pivoting of the pivot shafts 50 and 51 for a change in the transmission ratio is obtained by slight axial movement of the pivot shafts 50 and 51 in opposite directions. Such axial movement moves the traction rollers away from their neutral positions and causes them to walk to larger circles of engagement with one of the traction discs and to smaller circles of engagement with the other traction disc. After the desired transmission ratio change is completed, the pivot shafts are returned to their neutral positions in which the traction rollers remain in engagement with the traction discs at the given circles of engagement, i.e. at the given transmission ratio.

The arrangement described is not the only solution for the concept with which the present invention is concerned. Instead of the use of two hydraulically coupled piston and cylinder structures for the axial movement of the pivot shafts, hydraulically independent control structures may be used similar to the structure 56 wherein the control pressure signal is supplied to the cylinder and piston structures at each of the pivot shafts 50 and 51.

Also, for the rotation of the eccentric sleeves as well as the axial movement of the pivot shafts, mechanical linkages may be used such as shown in FIG. 4.

Here, the eccentric sleeves 61 and 62 are connected by mechanical linkages to a piston and movable cylinder structure 100 comprising a movable cylinder 102 having disposed therein a piston 104. The cylinder 102 is linked to the free end of a first pivot lever 106 and the piston 104 is linked to the free end of a second pivot lever 108, both being pivotally mounted on the housing. The first lever 106 is connected by a first operating arm 110 to the eccentric sleeve 61 and the second lever 108 is connected by a second operating arm 112 to the eccentric sleeve 62 such that relative movement of the piston 104 and cylinder 102 causes rotation of the eccentric sleeves in the opposite sense (if arranged as shown in FIGS. 5 and 4) in order to force the pivot shafts and traction rollers 25 and 26 toward each other and, at the same time, apply axial forces to the pivot shafts, in one direction to the one in the opposite direction to the other pivot shaft.

Although the means for moving the pivot shafts toward each other are shown only at one end of the pivot shaft they may be provided at both ends of the pivot shaft. Sufficient motion can, however, be obtained with the arrangement shown and, with the tension sheet support for the pivot shafts, normal shaft bearings may be used as the tilting caused by the slight movement of the shaft ends toward each other may easily be taken up by flexure of the tension sheets supporting the pivot shafts.

Instead of the piston and cylinder structure 100, a fully mechanical operating mechanism may be used wherein the levers 106 and 108 would be associated with a mechanical operating mechanism, an arrangement considered suitable especially for light-duty transmission.

By the arrangement of the linkage, that is particularly the arms 110 and 112, any change in tangential force applied to the traction rollers—corresponding to a change in torque transmitted through the transmission is instantly transmitted to the eccentric sleeves so as to adjust the contact pressure of the traction rollers.

Likewise, any change of control forces will not only change the tangential forces but also the control forces. Because the roller assembly rotates whereas the eccentric sleeve axis is fixed, the effective moment arm, due to the eccentricity, is modified and the contact force will increase both in underdrive and overdrive positions. The balance between these desirable affects can be changed by the position of the eccentric sleeve center relative to the pivot shaft center. At high overdrive ratios the rolling speed is maximum and the available traction coefficient is minimum. Accordingly, a better match of coefficient is possible with the present arrangement than with an axial cam, that is the forces at speed reduction are reduced, life of the arrangement is increased, and it is more compact.

What is claimed is:

1. In combination with an infinitely variable traction roller transmission comprising: coaxial input and output shafts; oppositely disposed toric elements, one being supported by each of said shafts for rotation therewith and arranged to face each other; at least two motion transmitting traction rollers disposed between said toric elements in radial symmetry and for engagement therewith so as to transmit motion from one to the other of the toric elements; a pivotal support structure for each of said traction rollers with pivot bearings at opposite sides of the respective traction rollers such that said pivotal support structures together with said traction rollers are pivotal about an axis normal to a plane which includes the axis of the input and output shafts; the improvement wherein at least one of said pivot bearings of each pivotal support structure is independently movably supported in such a manner as to permit relative movement thereof toward and away from the axis of the input and output shafts and means are provided for forcing said pivot bearings toward the axis of said input and output shafts for firm frictional engagement of said traction rollers with said toric elements.

2. A traction roller transmission as recited in claim 1, wherein each of said movable pivot shaft bearings is supported in a sleeve having an eccentric opening and means are provided for rotating said sleeves so as to force said pivot shafts toward each other.

3. A traction roller transmission as recited in claim 2, wherein said means for rotating said sleeves is a hydraulically operated piston arranged between said pivot shafts, and said eccentric sleeves have arms engaged by said piston for rotating said sleeves.

4. A traction roller transmission as recited in claim 3, wherein cylinder and piston structures are arranged at the axial ends of said pivot shafts and connected thereto for axially moving the opposite pivot shafts in opposite directions for a change of the transmission ratio and for applying axial forces to said pivot shafts as compensations for the axial forces applied to the pivot shafts by the traction rollers.

5. A traction roller transmission as recited in claim 4, wherein at least the piston connected to one of said pivot shafts is a slave piston and forms itself a cylinder receiving the front end of a control piston, the rear end of the control piston having an enlarged diameter and being exposed to a control fluid, there being provided means for admitting said control fluid to the area adjacent the rear end of said control piston and including a control device for controlling the pressure of said control fluid, said control device receiving said control fluid from a pressurized fluid supply source, and means for supplying said pressurized fluid from said source to the space between said control and said slave pistons, said slave piston having a discharge opening so arranged as to be opened and closed by said control piston thereby to cause said slave piston to follow the movement of said control piston.

6. A traction roller transmission as recited in claim 5, wherein said discharge opening is in communication with a relief valve maintaining a predetermined discharge pressure.

7. A traction roller transmission as recited in claim 6, wherein the other pivot shaft has associated therewith a double acting piston disposed in a cylinder, and side of the piston being exposed to the pressurized fluid of said fluid source and the other side being exposed to the discharge fluid pressure from said control opening so as to apply to said other pivot shaft essentially the same force as to the first pivot shaft but in an opposite direction.

8. A traction roller transmission as recited in claim 2, wherein said means for rotating said sleeves is a linkage arrangement consisting of arms linked at one end to said sleeves and extending at an angle to a plane including the axes of said pivot shafts and means are connected to the other end of said arms for axially moving said arms so as to cause rotation of said eccentric sleeves and, at the same time, apply axial forces to said pivot shafts.

9. A traction roller transmission as recited in claim 8, wherein said means for moving said arms are levers pivotally supported at one of their ends with their other ends connected to an operating structure, said arms having their other ends linked to the intermediate portions of said levers.

10. A traction roller transmission as recited in claim 9, wherein said operating structure consists of a movable cylinder having a piston disposed therein, the piston being linked to the other end of one and the cylinder being linked to the other end of the other of said levers and wherein means are provided for supplying pressurized fluid to said movable cylinder for moving said piston and said cylinder relative to each other.

* * * * *